United States Patent [19]
Habert

[11] 3,732,767
[45] May 15, 1973

[54] CUT-TO-LENGTH APPARATUS FOR BIAS-CUT TIRE BELT PLY MATERIAL

[75] Inventor: William C. Habert, Fraser, Mich.

[73] Assignee: Uniroyal, Inc., New York, N.Y.

[22] Filed: Nov. 26, 1971

[21] Appl. No.: 202,163

[52] U.S. Cl. .......................83/171, 83/513, 83/554, 83/555, 83/561, 83/582, 83/614, 83/618, 83/639
[51] Int. Cl. ...............................................B26d 7/10
[58] Field of Search.........................83/171, 554, 555, 83/513, 582, 614, 618, 561, 639

[56] References Cited

UNITED STATES PATENTS

| | | | |
|---|---|---|---|
| 2,665,757 | 1/1954 | Stevens et al. | 83/555 UX |
| 2,873,802 | 2/1959 | Frohlich et al. | 83/618 X |
| 2,936,664 | 5/1960 | Myers | 83/614 X |
| 3,641,855 | 2/1972 | Balle | 83/554 X |
| 3,654,828 | 4/1972 | Leblond et al. | 83/614 X |

*Primary Examiner*—Frank T. Yost
*Attorney*—Norbert P. Holler

[57] ABSTRACT

An apparatus for the contemporaneous bias-cutting of two elongated strips of rubberized tire belt or breaker ply material with reinforcing elements of opposed bias angles into relatively shorter belt ply-forming strips of predetermined lengths, each starting strip being cut from its middle toward its opposite edges. The apparatus includes two coaxial, rotatable, cylindrical drum-like anvils for the starting strips, and two pairs of normally retracted, non-rotary, heated cutting blades, the two blades of each pair being mounted for joint reciprocal opposed movements along a respective curved path the obliquity of the plane of which relative to the mid-circumferential plane of the associated drum can be adjusted, preferably about an axis located in the mid-circumferential plane of the associated drum and perpendicular to the drum axis, so as to correspond to any desired one of a range of such bias angles. The curvature of each path is such that in the mean adjusted position thereof it is disposed at a substantially constant spacing from the associated drum surface. The cutting blades of each pair are arranged to abut against each other at the mid-point of their respective path of movement, with the parting line of their cutting edge tip region in line with the associated pivot axis, so that any underlying strip is penetrated in the middle thereof when the blades are protracted against the associated drum surface. Suitable means are also provided for yieldingly urging the blades continuously into contact with the associated drum surfaces during the separating movements of the blades while performing the cutting operation so as to compensate for variations in the spacing between their paths of movement and the drum surfaces engendered by angular adjustments of the paths to other than the mean adjusted positions thereof.

15 Claims, 12 Drawing Figures

CUT-TO-LENGTH APPARATUS FOR BIAS-CUT TIRE BELT PLY MATERIAL

This invention relates to adjustable apparatus for bias-cutting elongated strips of tire belt or breaker ply material at any desired one of a range of bias angles so as to form shorter strips suited for use in the building of bias belts for belted pneumatic tires.

In the production of bias-belted tires, the belt structures thereof are built up of strips by belt ply material of predetermined lengths cut from relatively longer starting strips having plural reinforcing elements, generally in the form of cords or cables of metallic or nonmetallic filamentary materials, e.g. steel wire, rayon, glass fiber, etc., disposed parallel to one another in each strip and oriented at a relatively low angle to the longitudinal dimension of that strip. In a cutting operation of this type, it is preferred to make each cut through a strip at an angle equal to the bias angle of the reinforcing elements incorporated therein and along the space between two adjacent ones of such elements, both because this makes it easier to cut the strip and because it avoids cutting through any of the reinforcing elements each of which, for maximum belt strength, should extend across the entire width of its strip. This principle of cutting has heretofore been applied to the bias-cutting of tire carcass ply strips having reinforcing elements therein oriented at relatively high angles to the longitudinal strip dimension, for example by means of apparatuses such as those disclosed in U.S. Pat. Nos. 1,938,787 (Abbott, Jr.), 2,665,757 (Stevens et al.), and 3,429,490 (Cantarutti).

Furthermore, to minimize the size of the apparatus and to enhance its adaptability to the direct transfer of the cut belt ply strips to the building drum associated therewith, it is further preferred to perform the cutting operation on the peripheral surface of a cylindrical drum or like anvil structure. Such a system for carcass ply material is disclosed in the aforesaid Abbott patent, and one for belt ply material is disclosed in U.S. Pat. No. 3,547,732 (Leblond). Both in the latter system, however, which utilizes a rotary cutter traversable from one edge of the ply strip to the other, as well as in the Abbott system, the cutting path is fixed relative to the mid-circumferential plane of the drum, and the apparatus thus is adapted for cutting at only one given bias angle. Should a cut at a different angle become necessary, a different drum and cutter combination must be used. In the Stevens and Cantarutti systems, means are provided for effecting angular adjustments of the cutting paths, but in each case only relative to a flat or planar strip-supporting surface.

It is the principal object of the present invention, therefore, to provide an improved and greatly simplified cut-to-length apparatus for bias-cutting to shorter lengths elongated strips of low angle bias belt ply material, while the same are supported on a curved surface, and in particular to provide adjustable means in such an apparatus to enable the desired cuts to be made at any one of a range of angles of orientation of the cutting path corresponding to a range of possible belt cord bias angles.

Generally speaking, in accordance with the preferred aspects of the present invention the objectives thereof are attained by means of an apparatus equipped, in juxtaposition to a stationarily mounted rotatable cylindrical drum or like anvil structure, with a cutter assembly including an elongated arm structure and a cutter system carried thereby, the latter providing for a cutting action directed obliquely to the mid-circumferential plane of the drum, and the cutter assembly being constructed and arranged so as to permit an adjustment of the obliquity of the cutting direction over a desired angular range.

More particularly, the cutter system includes an arcuate track or guide rail extending lengthwise of the arm structure and obliquely to the mid-circumferential plane of the drum, the rail having a curvature which is such that the spacing between the rail and the peripheral drum surface radially of the latter remains constant over the entire length of the rail in the mean adjusted position of the cutter assembly. The arm structure is pivoted intermediate its ends to a rigid stationary framework, the pivot axis being located in the mid-circumferential plane of the drum and in perpendicular intersecting relation to the axis of rotation of the drum. Means are also provided for selectively locking the arm structure to the framework in any of the available adjusted positions, so as to fix the obliquity of the rail orientation accordingly.

Mounted on the rail are two carriages which are interconnected by a crossover cable and pulley system for joint movements in opposite directions between the middle region of the rail and its opposite end regions, such movements of the carriages being effected by means of a double-acting pneumatic piston and cylinder combination articulated at one end to the arm structure and at the other end to one of the carriages. Respective heated, non-rotary cutting blades are supported by the carriages in cooperative relation with the drum surface for movement lengthwise of the carriage path, the plane of movement of the blades being disposed to include the pivot axis of the cutter assembly. The cutting blades are constructed and arranged to abut against each other when the carriages are located in the middle region of the rail and to define, when in such abutting relation, a composite cutting edge tip region the parting line of which is in line with the pivot axis and thus with the longitudinal centerline of the starting strip then located on the drum. Also mounted on the carriages are respective double-acting pneumatic piston and cylinder combinations for protracting the blades from the carriages toward the drum surface preparatory to a separating or cutting stroke movement of the blades, for yieldingly urging the blades into continuous contact with the drum surface during such separating movement, i.e. during the entire cutting stroke, so as to compensate for any variations in the spacing of the carriage path from the drum surface along the length of the path such as will be encountered at any adjusted position of the path other than one corresponding to the mean cutting angle, and for retracting the blades from the drum surface and toward the carriages preparatory to and during the return or approaching movement thereof.

In a particularly advantageous refinement of the apparatus according to the present invention, a dual cutting arrangement including two such drums or anvils and associated angularly adjustable cutter assemblies is provided, both of the latter being essentially identical in construction but arranged in mirror image relation to each other at opposed obliquities relative to the mid-circumferential planes of their respective drums. Such an arrangement enables two elongated strips of belt ply material, in each of which the reinforcing elements are oriented at a bias angle falling within the contemplated range of such angles but opposed to the bias angle of the reinforcing elements in the other strip, to be cut contemporaneously on the two drums.

The foregoing and other objects, characteristics and advantages of the present invention will be more clearly understood from the following detailed description of a preferred embodiment thereof when read in conjunction with the accompanying drawings, in which:

Referring now to the drawings in greater detail, the apparatus 20 (FIG. 1) according to the preferred aspects of the present invention comprises a pair of coaxial, substantially cylindrical drums or like structures 21 and 22 adapted to be codirectionally rotated, preferably in an alternating sequence, by means of suitable drive means (not shown). The drums constitute a pair of anvils for temporarily supporting respective portions of a pair of elongated strips 23 and 24 of oppositely bias-cut rubber and cord belt ply material to be cut into shorter strips of predetermined lengths for use in the building of bias belt structures for pneumatic tires. The drums are preferably made of steel or other hard and rigid material and may, for example, be in the form of flanged wheels the outer peripheral surfaces of which are sufficiently wide to support the entire widths of the belt ply strips. The means for retaining the strips on the drums may be in the form of well-known mechanical fasteners or suction devices. Alternatively, in the case where the reinforcing elements are in the form of steel wires or cables, the strip-retaining means may be in the form of magnetic means, e.g. masses of magnetic rubber suitably arranged over the peripheral drum surfaces, as disclosed in the aforesaid Leblond patent, and where desired also other types of magnetic elements. For the sake of simplicity, and also in view of the fact that such retaining means constitute no part of the present invention, they have not been explicitly illustrated in the drawings and will not be further described herein.

The apparatus 20 further comprises a framework 25 located adjacent the drums 21 and 22 and bridging a portion of the periphery of each of them, and a pair of elongated cutter assemblies 26 and 27 angularly adjustably supported, in a manner to be more fully explained presently, by the framework 25 in operative juxtaposition to the peripheral strip-supporting surfaces of the drums 21 and 22, respectively. The cutter assemblies are oriented generally obliquely to the mid-circumferential planes of their associated drums and thereby provide for correspondingly angled cutting actions, but the respective orientations are opposed to each other so as to accommodate the belt ply strips 23 and 24 in the former of which the reinforcing elements 23a (FIG. 1a) are disposed at a bias angle $\alpha$ relative to the longitudinal strip dimension opposed to the bias angle $\beta$ of the reinforcing elements 24a (FIG. 1b) in the strip 24. Normally, of course, for tires intended to have symmetrical and balanced belt structures, these angles will be equal as well.

The framework 25 includes parallel longitudinal frame members 28 and 29 rigidly secured at their opposite ends to parallel cross frame members 30 and 31. The framework further includes a transverse rail or cross frame member 32 which is adjustable to a limited degree longitudinally of the members 28 and 29. For this purpose, the rail 32 is welded at its opposite ends to a pair of upstanding rigid plates 33 and 34 secured in turn, by welding and with the aid of triangular stiffening braces 35 and 36, to respective base plates 37 and 38. The latter are provided with elongated slots and are seated on the frame members 28 and 29, respectively, being releasably secured thereto by means of bolts 39 and 40 the shanks of which extend through the slots. All of the various frame members are preferably made of square cross-section tubular steel.

Figures 1, 1A, 1B:
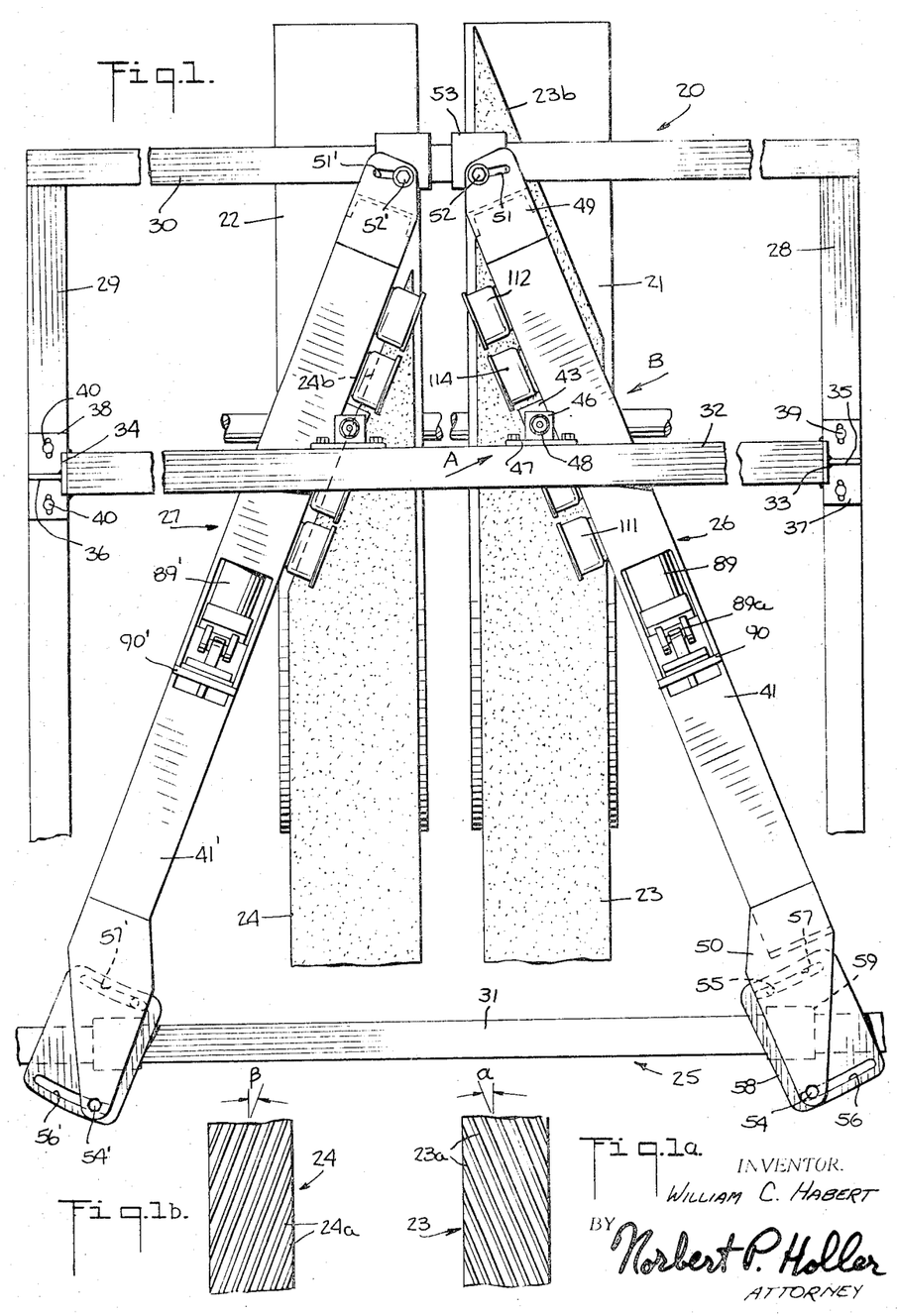
FIG. 1 is a fragmentary plan view of a dual cut-to-length apparatus according to the present invention.
FIGS. 1a and 1b are fragmentary plan views of two strips of belt ply material having mutually oppositely angled reinforcing elements incorporated therein and intended to be cut to length by the apparatus shown in FIG. 1.

The cutter assemblies 26 and 27 are of identical construction and are identically mounted on the framework 25 except, as clearly shown in FIG. 1, for being arranged in mirror image relation to each other. A detailed description of the cutter assembly 26 will thus suffice for both. Wherever it is deemed advisable, however, parts of the assembly 27 will be designated by primed duplicates of the reference numerals used to designate the corresponding parts of the assembly 26.

Figure 6:
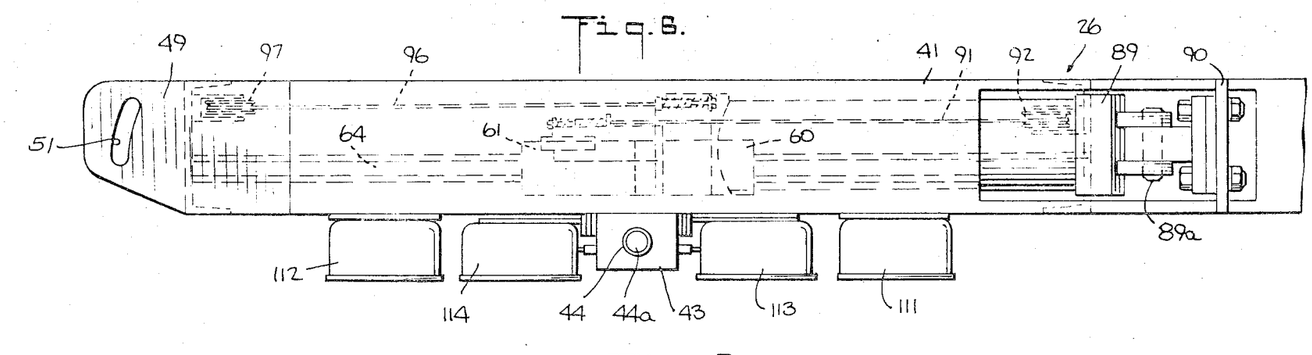
FIG. 6 is a fragmentary top plan view, on an enlarged scale, of the cutter assembly structure per se shown in FIG. 2.
Figure 7:
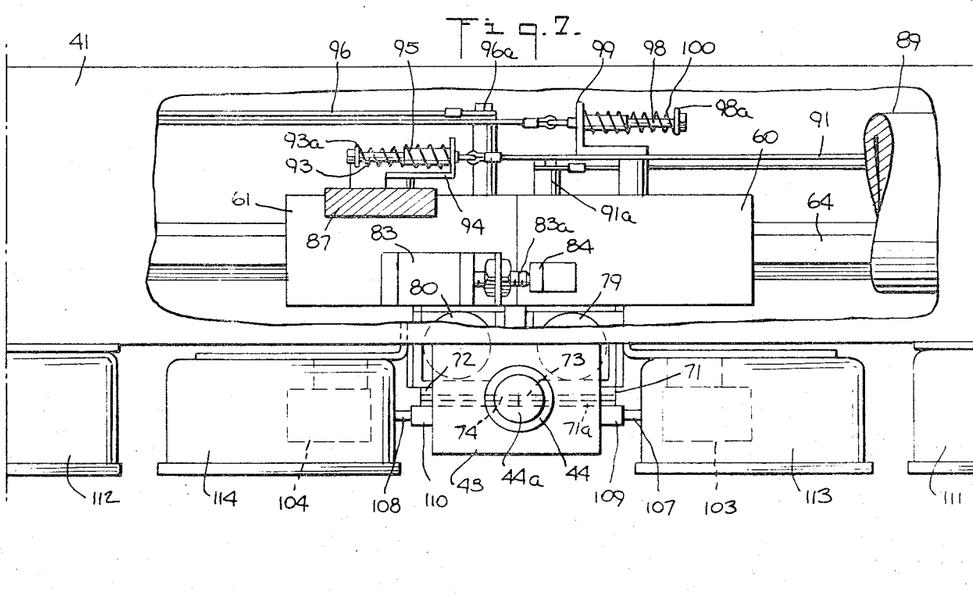
FIG. 7 is an enlarged plan view of a portion of the structure shown in FIG. 6, some parts being broken away to show interior details.

The cutter assembly 26 comprises an elongated beam-like arm structure 41 supporting the respective cutter system 42 (FIGS. 2 to 5) in overlying relation to the drums 21. The arm structure 41 is provided with a welded on, frontwardly directed bracket 43 (see also FIG. 9) to which is rigidly secured an upstanding pivot pin or bolt 44. The latter extends through a flanged bearing 45 (not shown in FIGS. 6, 7 and 9). The bearing 45 is in turn received in the corresponding bore of a pivot bracket 46 which is welded to a mounting plate 47 bolted to the rail or cross frame member 32. The axis of the pivot bracket bore and thus the pivot axis for the cutter assembly 26 is located in the mid-circumferential plane of the drum 21 and in perpendicular intersecting relation to the axis of rotation of the drum (fine adjustment into this position being facilitated by the presence of the slotted plates 37–38 and the associated locking bolts 39–40). A nut 48 (FIG. 1) screwed, above a suitable washer, onto the threaded extension 44a of the pivot pin 44 projecting beyond the top of the bracket 46 serves to secure the arm structure 41 loosely to the rail 32.

At its opposite ends, the arm structure 41 is rigidly secured to respective extension plates 49 and 50. In the illustrated arrangement, the plate 49 is provided with an arcuate slot 51 the center of curvature of which coincides with the said pivot axis, the slot freely receiving therein the shank of a releasable locking bolt 52 secured at one end to an anchor bracket 53 clamped to the cross member 30 of the framework 25. Correspondingly, the plate 50 carries a locking bolt 54 and a guide pin 55, the locking bolt extending through an arcuate slot 56, and the guide pin through an arcuate slot 57, both provided in a guide plate 58 mounted on an anchor bracket 59 clamped to the cross member 31 of the framework 25. The slots 46 and 57 have a common center of curvature coinciding with the pivot axis of the cutter assembly 26, and the paired locking bolt 54 and guide pin 55 received in those slots are shown as being disposed in a single straight line with the said pivot axis.

It will be understood, therefore, that the cutter assemblies 26 and 27 can be angularly adjusted about their respective pivot axes, to the extent permitted by the sets of slots 51/56/57 and 51'/56'/57' (FIG. 1), so as to vary the obliquity of their orientations relative to the mid-circumferential planes of the drums 21 and 22, and that the cutter assemblies can be locked in any of their adjusted positions by means of the sets of bolts 52/54 and 52'/54' (FIG. 1). The available range of angular adjustment will, of course, be chosen to accommodate at least the range of bias angles (a typical range might be about 18°–24°) at which the reinforcing elements 23a and 24a may be oriented in the belt ply strips 23 and 24 to be serviced on the apparatus 20.

Figure 8:
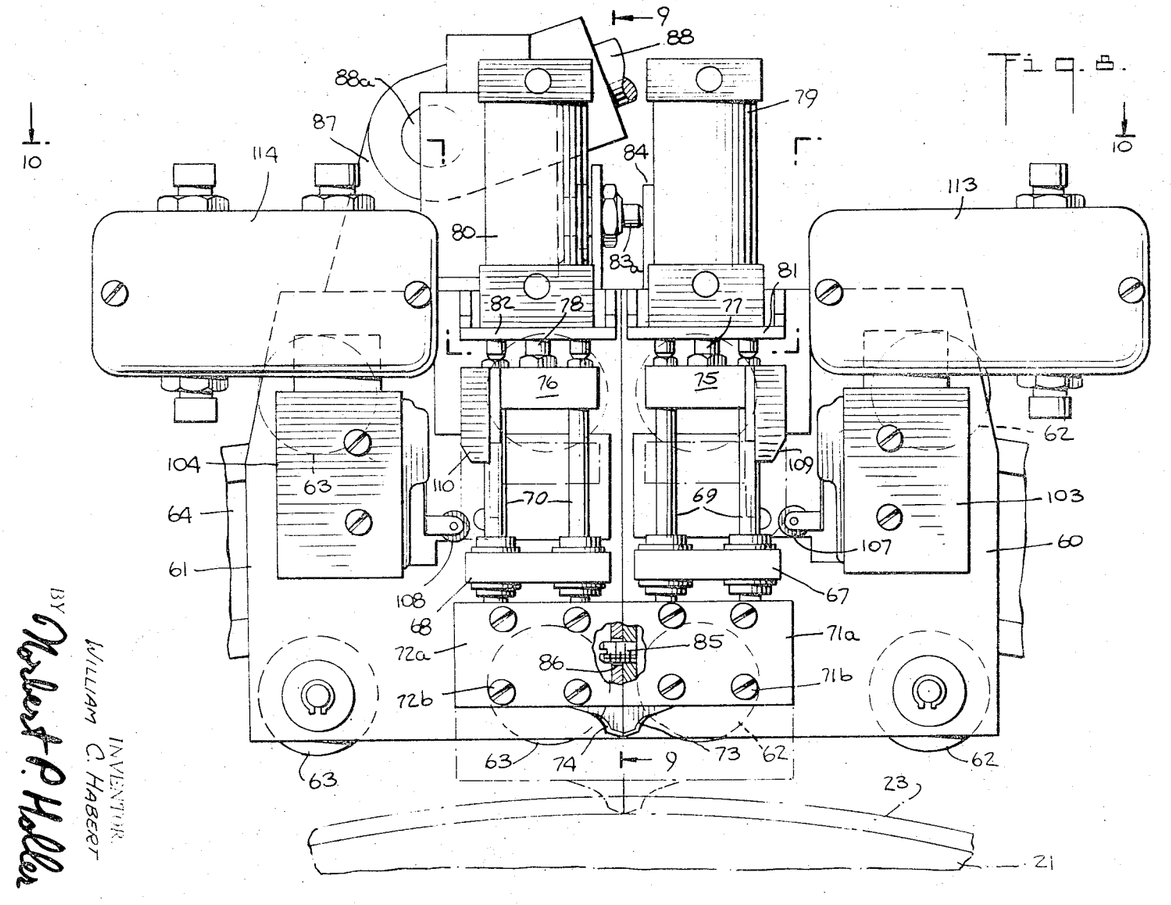
FIG. 8 is a fragmentary front elevational view, on an enlarged scale, of a portion of the structure shown in FIG. 7, some parts being omitted for clarity.
Figure 9:
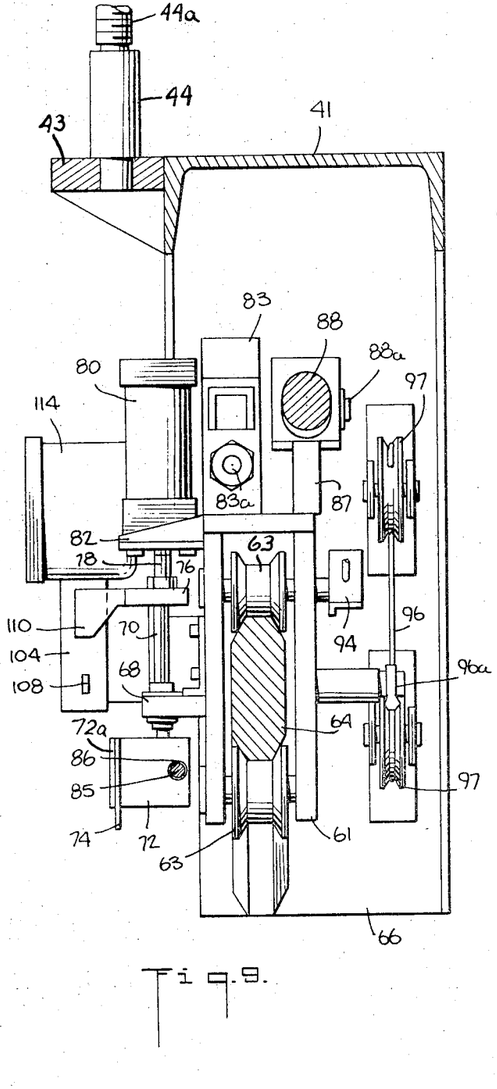
FIG. 9 is a sectional view taken along the line 9—9 of FIG. 8.

The cutter system 42 comprises a pair of carriages 60 and 61 (FIGS. 2 to 5, 7 and 8) mounted to ride reciprocally by means of respective sets of wheels 62 and 63 on a curved track or guide rail 64 (see also FIG. 9). The rail 64 extends generally lengthwise of the arm structure 41 and oblique to the mid-circumferential plane of the drum 21, and is connected at its opposite ends to a pair of brackets 65 and 66 secured to the underside of the arm structure. The curvature of the guide rail 64 follows and approximates that of the drum 21, the arrangement preferably being such that in the mean adjusted position (not shown) of the cutter assembly 26, the spacing between the guide rail and the drum radially of the latter remains constant over the entire length of the guide rail. In the illustrated adjusted position of the cutter assembly 26, therefore, the spacing of the guide rail from the drum will be slightly greater in the regions of the two ends of the rail than in the middle region thereof, while the converse (not shown) would be true with the cutter assembly shifted to the other side of the mean adjusted position thereof.

The carriages 60 and 61 are provided with frontwardly directed guide brackets 67 and 68 through which slidably extend respective sets of tie rods 69 and 70 secured at their lowermost ends to respective blade holders 71 and 72 advantageously constructed in the form of housings carrying a pair of preferably electrical heating elements (not shown). Two mated cutting blades 73 and 74 with respective active or cutting edges facing generally in opposite directions away from each other, are removably secured to the frontwardly facing sides of the housings 71 and 72, for example by means of retainer plates 71a–72a and screws 71b–72b, and are in heat exchange relation to the heating elements therein. At their upper ends, the tie rods 69 and 70 are rigidly secured to respective cross-heads 75 and 76 which are connected to the respective free ends of a pair of piston rods 77 and 78 projecting from a pair of double-acting pneumatic cylinders 79 and 80. The latter are rigidly mounted on the carriages 60 and 61 by means of brackets 81 and 82 (FIGS. 8 and 9). The arrangement is such that with the piston rods 77 and 78 drawn in, the cutting blades 73 and 74 are retracted toward the carriages and into their solid-line positions shown in FIG. 8 (see also FIG. 2), while upon activation of the cylinders 79 and 80 in the opposite sense the blades are protracted from the carriages and into their broken-line positions shown in FIG. 8, i.e. against the surface of the drum 21 (see also FIGS. 3 and 5) so as to penetrate through the rubber of the belt ply strip 23. For reasons which will become clear as the description proceeds, the cutting blades are constructed to define, when in abutting relation with each other (corresponding to the carriages 60 and 61 being in their closed or abutting positions in the middle region of the guide rail 64), a merged cutting edge tip region the parting line of which is in line with the pivot axis of the cutter assembly 26 ( see FIGS. 7 and 9).

The cylinders 79 and 80 are, as will be more fully explained presently, under the control of a limit switch 83 mounted atop the carriage 61. The switch 83 has an operating rod or like member 83a adapted, upon the carriages reaching their closed positions, to come into contact with and be displaced out of its normal or rest state by a lug or abutment member 84 rigidly mounted atop the carriage 60. For the sake of clarity, the switch 83/83a and member 84 are not shown in FIGS. 2 and 3. A guide or dowel pin 85, carried by and projecting from the housing 71 on the side thereof facing the housing 72, cooperates with a correspondingly dimensioned opening 86 in the housing 72 to ensure proper alignment of the cutting blades 73 and 74 in the closed positions of the carriages.

For the purpose of effecting the desired separating and approaching movements of the carriages and the cutting blades supported thereby, the carriage 61 is provided with an upstanding rigid bracket or lug 87 to which one end of a piston rod 88 projecting from a double-acting pneumatic cylinder 89 is articulated at 88a. The other end of the cylinder 89 is articulated at 89a to a cross bracket or strut 90 rigidly secured to the arm structure 41. Concomitantly, to constrain the carriages to joint movements in opposite directions, the carriages are interconnected with each other by a crossover cable system. One half of the system includes a cable 91 having one end thereof fixedly anchored to the carriage 60 at 91a, its medial region trained about a pair of pulleys 92 mounted on the bracket 65, and its other end yieldingly anchored to a bolt 93 extending slidably through a bracket 94 fixed to the carriage 61, the bolt 93 having a compression spring 95 coaxially interposed between the bracket 94 and a flange or shoulder structure 93a provided on the bolt. Similarly, the other half of the system includes a second cable 96 having one end thereof fixedly anchored to the carriage 61 at 96a, its medial region trained about a pair of pulleys 97 secured to the bracket 66, and its other end yieldingly anchored to a bolt 98 extending slidably through a bracket 99 fixed to the carriage 60, the bolt 98 having a compression spring 100 coaxially interposed between the bracket 99 and a shoulder or flange structure 98a provided on the bolt.

Figure 2:
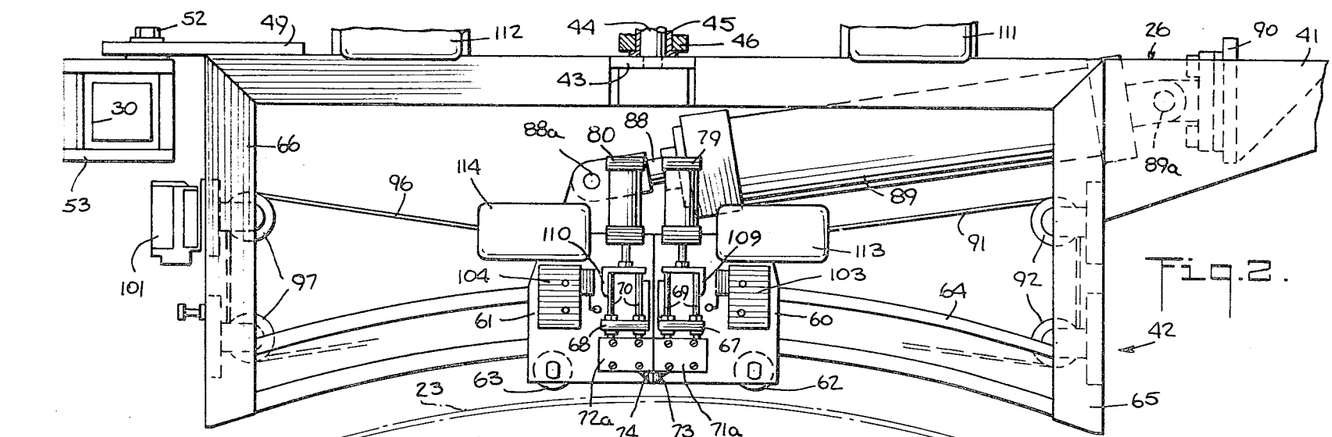
FIG. 2 is a fragmentary elevational view, partly in section, of the right-hand portion of the apparatus shown in FIG. 1, the view being taken generally in the direction of the arrow A and showing the cutter system from the front and in its inactive state.
Figure 3:
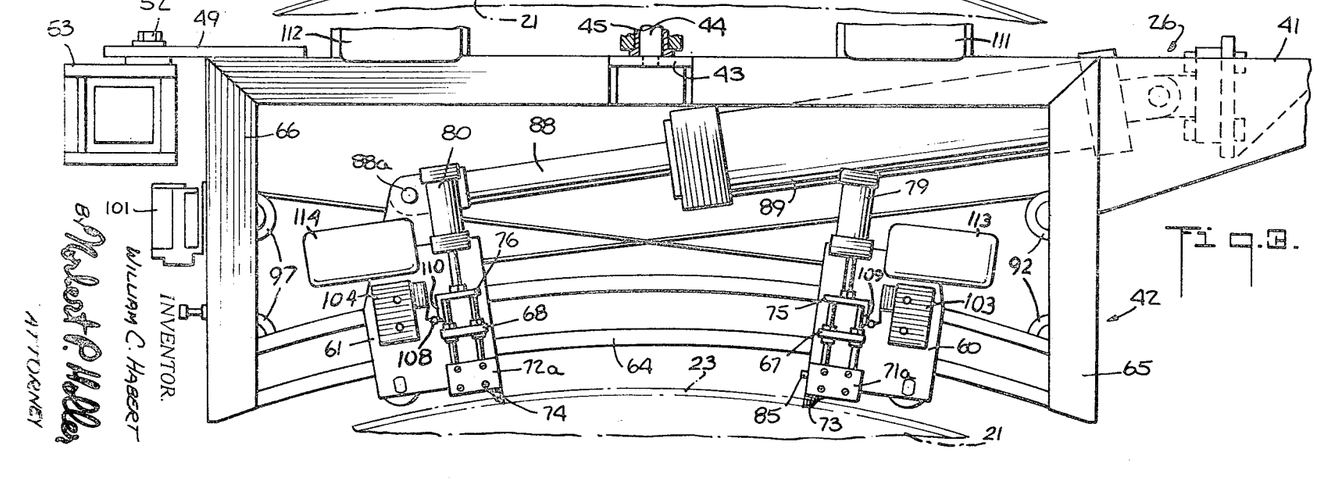
FIG. 3 is a view similar to FIG. 2 but showing the cutter system activated and in the process of a cutting stroke.
Figures 4, 5:
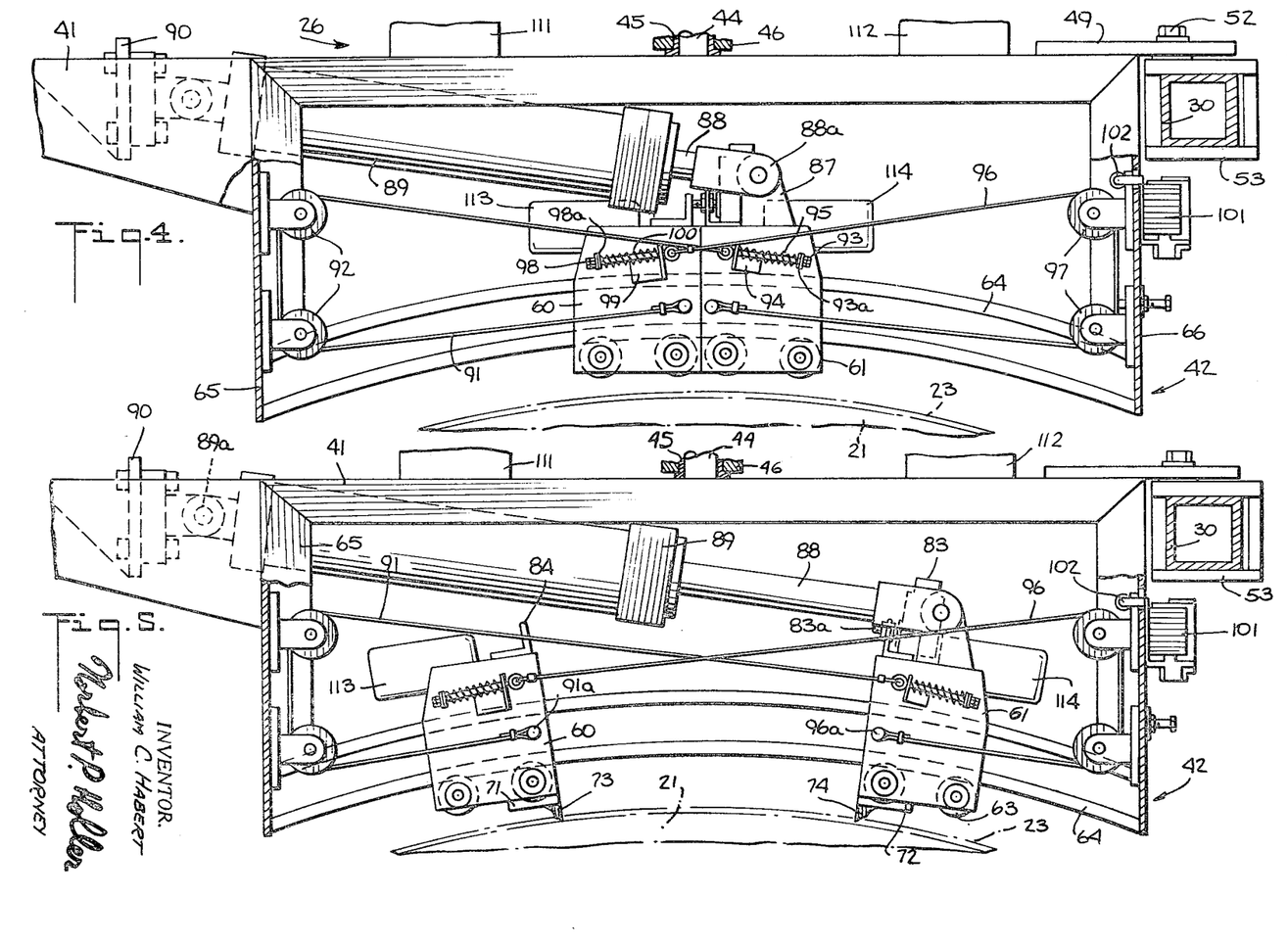
FIG. 4 is another fragmentary elevational view, partly in section, of the right-hand portion of the apparatus shown in FIG. 1, this view, however, being taken in the direction of the arrow B and showing the cutter system from the back and in its inactive state.
FIG. 5 is a view similar to FIG. 4 but showing the cutter system activated and in the process of a cutting stroke.

As will be clear, therefore, when the piston rod 88 is protracted from the position shown in FIGS. 2 and 4 to the position shown in FIGS. 3 and 5, the carriage 61 is pushed along the rail 64 from the middle region of the latter toward the bracket 66, and simultaneously the carriage 60 is pulled in the opposite direction through the intermediary of the cable 91. Upon reverse actuation of the piston rod 88 thereafter, the carriage 61 will be pulled away from the bracket 66 and toward the middle region of the rail 64, and simultaneously the carriage 60 will be pulled toward the middle region of the rail 64 and thus toward the carriage 61 through the intermediary of the cable 96.

Figure 10:
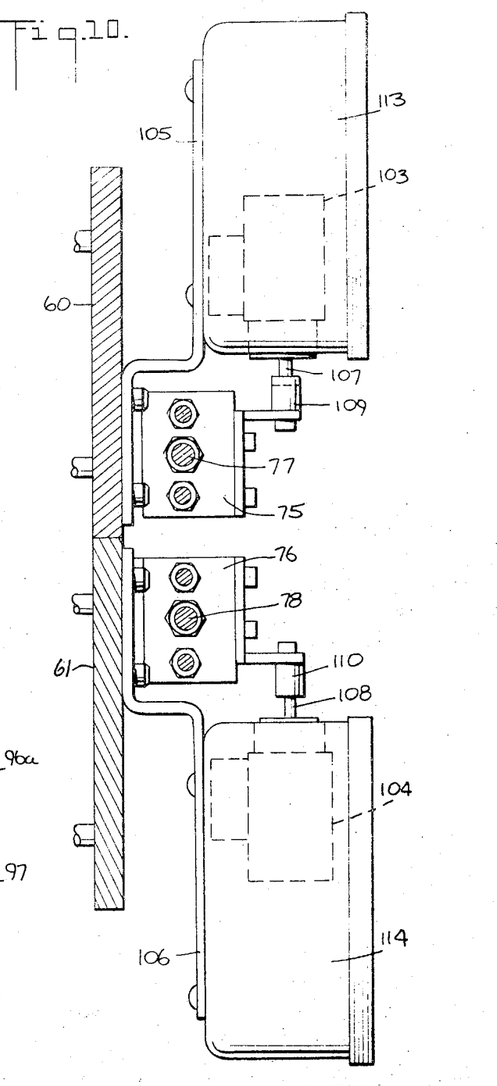
FIG. 10 is a sectional view taken along the line 10—10 in FIG. 8, with the view being drawn rotated through an angle of 90°.

The apparatus 20 also includes means for controlling the activation of the cylinders 79, 80 and 89 in one sense or the other at different stages of each operating cycle. Included in the control means is the already mentioned limit switch 83 the operating member 83a of which is adapted to be engaged and pushed in upon the carriages 60 and 61 being in their closed positions, which are their starting positions for each cycle. In addition, a limit switch 101 is mounted on the bracket 66, the switch 101 being provided with an operating arm or member 102 (FIGS. 4 and 5) adapted to be contacted and displaced by an adjunct (not shown) of the carriage 61 when the latter reaches a predetermined point of its outward travel. Two additional limit switches 103 and 104 are mounted on the carriages 60 and 61, respectively, e.g. by means of suitable brackets 105 and 106 (FIG. 10), these switches having operating arms or members 107 and 108 adapted to be contacted and displaced, upon completion of the protraction of the cutting blades 73 and 74, by corresponding cam members or like adjuncts 109 and 110 (FIGS. 2, 3 and 8) secured to the cross-heads 75 and 76.

The various switches are connected into the control circuitry (not shown) of the apparatus, suitable junction boxes 111 and 112 on the arm structure 41 and junction boxes 113 and 114 on the carriages 60 and 61 being provided for the respective electrical cables (not shown). The switches serve to operate the control valves (not shown) through which fluid pressure can be admitted to one end or the other of each of the cylinders 79, 80 and 89. The arrangement is such that when the cutting blades are retracted, the carriages must be in their closed positions, i.e. the switch 83 must be activated and the switch 101 deactivated, to permit admission of fluid pressure into the blind ends of the cylinders 79 and 80 and the consequent protraction of the cutting blades 73 and 74 to take place; the blades must be protracted or down in the closed position of the carriages, i.e. the switches 83, 103 and 104 must be activated, to permit admission of fluid pressure into the blind end of the cylinder 89 and the consequent outward travel of the carriages for the cutting stroke to take place; when the cutting blades are protracted, the carriages must be in the opened positions, i.e. the switch 101 must be activated, to permit admission of fluid pressure into the piston rod ends of the cylinders 79 and 80 and the consequent retraction of the blades from the drum to take place; and the blades must be retracted or up in the opened positions of the carriages, i.e. the switches 103 and 104 must be deactivated and the switch 101 activated, to permit admission of fluid pressure into the piston rod end of the cylinder 89 and the consequent return movements of the carriages into their closed and starting positions to take place. The control circuitry (which normally will also include means for starting and stopping the operation of the apparatus, means for selectively setting the same for automatic or manual operation, malfunction-responsive safety control means, and other components conventionally used in such circuits) has not been explicitly illustrated in the drawings, however, since the arrangement and interconnections of the various switches and of the associated solenoids, relays and other related operating instrumentalities required to enable the apparatus to function as described, will be within the ken of those skilled in the art.

The operation of the apparatus according to the present invention for cutting the two starting elongated belt ply strips 23 and 24 into respective shorter strips (not shown) of lengths dictated by the intended belt circumferences of the tires then being built, is as follows:

It is assumed that a bias-cutting operation, performed on starting strips 23 and 24 initially fed in properly centered relation into the respective drums 21 and 22 in any suitable manner has been completed. The two cutter assemblies 26 and 27 are in their respective adjusted positions required to orient the directions of movement of the two pairs of carriages and the associated cutting blades at respective oblique angles to the mid-circumferential planes of the drums, i.e. to the strip feed directions, corresponding to the bias angles of the reinforcing elements 23a and 24a in the strips. On both drums, the now leading edge regions 23b and 24b of the respective strips are retained in place by suction, mechanical fasteners or magnetic means, as hereinbefore described. In the illustrated state, the drum 21 is being rotated to advance the required length of the strip 23 past the associated cutter system 42, the latter during this time being in the stage thereof shown in FIGS. 2, 4 and 8, with the carriages in their closed positions and the cutting blades up, i.e. retracted. At the same time, the drum 22 is halted with the leading edge 24b of the strip 24 just in front of the pivot axis of the cutter assembly 27 while the cutting blades thereof are retracted and being returned to their starting positions.

Referring now exclusively to the drum 21 and cutter assembly 26, when the drum again stops rotating, the cutting blades 73 and 74 are protracted toward the drum and are forced through the rubber of the strip 23 against the surface of the drum. Thereupon, as soon as the blades are fully down, the activation of the switches 103 and 104 enables fluid pressure to be admitted into the blind end of the cylinder 89 to start the outward or separating travel of the carriages 60 and 61 and thereby the performance of the cutting operation.

It will be understood that by virtue of the alignment of the parting line of the cutting edge tip region of the blades 73 and 74, when the same are in abutting relation with each other, with the pivot axis of the cutter assembly 26, as previously described, the initial penetration of the strip 23 by the cutting blades occurs precisely on the longitudinal centerline of the strip. The latter thus is cut from its middle toward its opposite edges, and with the blades being non-rotary, flat and thin, as shown, and moving in a plane the obliquity of which corresponds to the bias angle α of the reinforcing elements 23a in the strip, the blades cut the strip entirely lengthwise of and between two adjacent ones of the said reinforcing elements. The pressure in each of the cylinders 79 and 80 is, moreover, maintained in any suitable manner at a level sufficient not only to effect the initial penetration but also to enable the cylinders to compensate for the slight increase in the spacing of the guide rail or track 64 from the drum surface, in the direction going from the middle of the rail toward the ends thereof, by continuously urging the individual blades to remain in contact with the drum surface throughout the cutting stroke. (In adjusted positions of the cutter assembly on the other side of the mean adjusted position, of course, the cylinders compensate for the slight decrease in the drum to rail spacing lengthwise of the latter by providing a yielding back-up force on the cutting blades so as to permit the same to follow the drum surface contours without risk of damage). Distortion of the strip as well as the possibility of the blades either jumping across or cutting through any of the reinforcing elements are thereby effectively eliminated, which leads to a substantial reduction in scrap losses and also lessens the likelihood of misalignment of the plies during formation of the ultimate belt on the building drum. Both the initial penetration and the subsequent cutting are, in addition, greatly facilitated by the heating of the blades, and the attachment of the latter to the heater housings 71 and 72 in the manner shown enables blades to be easily removed for sharpening and/or replacement.

Reverting now to the operation of the apparatus, when the cutting stroke of the blades 73 and 74 is finished, the switch 101 is activated in response to the carriage 60 reaching the end of its travel path and effects the retraction of the blades. The consequent deactivation of the switches 103 and 104 then enables fluid pressure to be admitted into the piston rod end of the cylinder 89 to return the carriages 60 and 61 to their starting positions. This action can thus take place without any risk of the blades either damaging the strip material on the drum or being damaged themselves. At the same time, the drum 21 is again rotated to advance the leading edge region 23b of the now severed strip to a transfer device (not shown) juxtaposed to and cooperating with the drum to enable the strip to be removed from the drum and transferred to the belt building location. As soon as the carriages again reach their starting positions, the switch 83 is reactivated and the control circuit is conditioned to start the next cycle in response to the drum 21 coming to a halt with a sufficient new length of the starting strip material 23 having passed the cutting line.

Concurrently with the foregoing, the operation of the drum 22 and cutter assembly 27 proceeds in a manner identical, except for the orientation of the cutting line relative to the strip feed path, to the operation of the drum 21 and cutter assembly 26 as so far described. Repetition of that description will thus not be necessary herein. It should merely be noted that the two halves of the apparatus can be operated jointly or in tandem, with the latter approach being preferred for a full-fledged manufacturing run since it enables the transfer device to take the severed strips one at a time from each of the drums in a continuous alternating sequence, so that the strips can be combined directly, without inversion of either one, into mutually superposed relation placing the reinforcing elements in each ply of the so-formed belt structure in crossing relation to those of the other ply.

It will be understood, of course, that in addition to the transfer mechanism there will be various other pieces of equipment normally associated with the apparatus 20, i.e. the means for feeding the strips 23 and 24 to and centering them on the drums, the tire building machinery per se, etc. These do not, however, constitute parts of the present invention, and thus they have been neither illustrated nor described in detail herein.

It will be further understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims. Merely by way of example, the available range of angular adjustments of the cutter assemblies may be larger than the typical 6° range alluded to and may, in fact, be larger than the possible range of bias angles to be encountered in strips being cut to length. Since space is normally at a premium in any tire plant, however, it will be found most advantageous to provide an adjustability range no larger than the bias angle range to be dealt with, which will enable any given apparatus 20 to occupy the minimum possible amount of space. Again, the starting strip need not be applied to the drum in precisely centered relation thereto. In such a case, the strip will be pierced off the centerline. This, however, will have no adverse effect even though one blade will finish its cut before the other, since the retaining means will hold the strip in place on the drum until the second blade finishes its cut.

Having thus described the invention, what is claimed and sought to be protected by Letters Patent is:

1. In an apparatus for bias-cutting an elongated starting strip of rubberized tire belt ply material, which has a multiplicity of parallel cord-like reinforcing elements therein obliquely oriented at a given bias angle to the longitudinal strip dimension, into at least one relatively shorter belt ply-forming strip, with the cutting of starting strip being initiated at an interior region thereof and proceeding therefrom toward its opposite edges in a line parallel to said reinforcing elements, which apparatus includes a. a rotatable drum having a hard peripheral surface constituting an anvil for supporting the full width of a predetermined length portion of said starting strip during a cutting operation,
   b. a pair of non-rotary cutting blades, and
   c. carriage means supporting said cutting blades and mounted for reciprocal separating and approaching movements along an arcuate path spaced radially from said drum surface and included in a plane normal to said drum surface and oriented obliquely to the mid-circumferential plane of said drum at an angle corresponding to the bias angle of said reinforcing elements in said starting strip, d. each of said carriage means being arranged to move between an intermediate region of said path, in which region said cutting blades abut against each other, and a respective one of the end regions of said path, and e. said cutting blades when in abutting relation presenting a cutting edge tip configuration the parting line of which overlies said interior region of said starting strip;

the improvement comprising:

A. means for angularly adjusting the obliquity of said path relative to said mid-circumferential plane of said drum over a range of angles of orientation corresponding at least to a possible range of different bias angles at which said reinforcing elements may be oriented in different starting strips to be cut;

B. said path having a curvature such that the spacing between said path and said drum surface normally of the latter
 1. is constant lengthwise of said path in one adjusted position thereof corresponding to a selected one of said different possible bias angles, and
 2. varies lengthwise of said path in all other adjusted positions thereof;

C. means operatively connected with said carriage means for jointly moving the same and thus said cutting blades to effect said separating and approaching movements thereof; and D. means operatively connected with said cutting blades
 1. for protracting said cutting blades from said carriage means and against said drum surface, and thus through said starting strip when the same is located on said drum surface, preparatory to a separating movement of said cutting blades,
 2. for yieldingly urging said cutting blades, upon protraction thereof, into continuous contact with said drum surface during a separating movement of said cutting blades and the performance of a cutting operation, thereby to compensate for any variation in said spacing of said path from said drum surface lengthwise of said path which results when the latter is in any other than said one adjusted position thereof, and
 3. for retracting said cutting blades from said drum surface and toward said carriage means preparatory to and during an approaching movement of said cutting blades subsequent to completion of the cutting operation.

2. An apparatus as claimed in claim 1 which also includes an additional section comprising duplicates of said rotatable drum, of said paired non-rotary cutting blades, and of said named means associated therewith, all substantially identical in construction and arrangement with the corresponding elements of the first-recited apparatus section except for the fact that the duplicate carriage means are mounted for movement along an arcuate path included in a plane the obliquity of which to the mid-circumferential plane of the duplicate drum is opposed to the obliquity of the plane of said path of said first-named carriage means to said mid-circumferential plane of said first-named drum, thereby to enable the contemporaneous bias-cutting, in said additional apparatus section, of a second starting strip in which the respective reinforcing elements are oriented at a bias angle opposed to that of said reinforcing elements in said first-named starting strip.

3. An apparatus as claimed in claim 1, wherein said curvature of said path is such as to provide said constant spacing between said drum surface and said path in the mean adjusted position of the latter.

4. An apparatus as claimed in claim 1, wherein said means for adjusting the obliquity of said path relative to said mid-circumferential plane of said drum is constructed and arranged for angular movement about a pivot axis located in perpendicular intersecting relation to the axis of rotation of said drum and included in the plane of movement of said cutting blades.

5. An apparatus as claimed in claim 4, wherein said pivot axis is included in said mid-circumferential plane of said drum, said cutting blades being constructed and arranged so as to have said parting line of said cutting edge tip configuration thereof located in line with said pivot axis and the longitudinal centerline of said starting strip when said cutting blades are in said abutting relation thereof.

6. An apparatus as claimed in claim 5, wherein said curvature of said path is such as to provide said constant spacing between said drum surface and said path in the mean adjusted position of the latter.

7. An apparatus as claimed in claim 1, further comprising an arm structure supporting said carriage means defining said path of movement thereof, and said adjusting means comprising means mounting said arm structure for displacement into a number of different positions each providing a different obliquity of said path within said range of angles of orientation, and means for selectively locking said arm structure in each of said different positions thereof.

8. An apparatus as claimed in claim 7, said mounting means comprising fixed frame means juxtaposed to said drum, and a pivot bolt interconnecting said frame means and said arm structure intermediate the ends of the latter, said locking means comprising a pair of co-operating curved slot and locking bolt combinations interconnecting said frame means and said arm structure at said opposite ends of the latter, respectively, each of said slots having its center of curvature coinciding with the axis of said pivot bolt and subtending an angle at least equal to said range of angles of orientation.

9. An apparatus as claimed in claim 8, said cutting blades being constructed and arranged so as to have said parting line of said cutting edge tip configuration thereof located in line with said axis of said pivot bolt when said cutting blades are in said abutting relation thereof.

10. An apparatus as claimed in claim 8, said pivot bolt being arranged to have said axis thereof located in said mid-circumferential plane of said drum and in perpendicular intersecting relation to the axis of rotation of said drum, and said cutting blades being constructed and arranged so as to have said parting line of said cutting edge tip configuration thereof located in line with said axis of said pivot bolt when said cutting blades are in said abutting relation thereof.

11. An apparatus as claimed in claim 10, further comprising a guide rail carried by said arm structure, said guide rail supporting said carriage means and defining said path of movement thereof, and a pair of blade holder means supported by said carriage means, respectively, for movement therewith, each of said cutting blades being removably connected to a respective one of said blade holder means, said protracting/urging/retracting means being connected with said blade holder means, and said guide rail being of arcuate configuration and imparting said curvature to said path.

12. An apparatus as claimed in claim 11, further comprising respective heater means carried by said blade holder means in heat exchange relation to said cutting blades for heating the latter to facilitate the cutting operations thereof.

13. An apparatus as claimed in claim 11, said guide rail being located laterally of said axis of said pivot bolt, and said blade holder means supporting said cutting blades laterally of said guide rail and in coplanar relation with both each other and said axis of said pivot bolt.

14. An apparatus as claimed in claim 13, said means for moving said cutting blades comprising a double-acting fluid pressure piston and cylinder combination articulated at one end to said arm structure and at the other end to one of said carriage means, and a crossover cable system interconnecting said carriage means with one another to constrain the same to either said separating or said approaching movements upon appropriate activation of said piston and cylinder combination in one sense or the other.

15. An apparatus as claimed in claim 13, said protracting/urging/retracting means comprising a pair of double-acting fluid pressure piston and cylinder combinations mounted on said carriage means, each of said piston and cylinder combinations having one member thereof fixedly secured to its respective carriage means and having the other member thereof movable relative to said one member and secured to the associated one of said blade holder means.

* * * * *